United States Patent [19]
Beisch et al.

[11] 4,231,619
[45] Nov. 4, 1980

[54] WHEEL TRIM RETENTION MEANS

[75] Inventors: Hans R. Beisch, Amherstburg, Canada; Heinrich J. Hempelmann, Livonia, Mich.

[73] Assignee: Norris Industries, Inc., Ypsilanti, Mich.

[21] Appl. No.: 963,735

[22] Filed: Nov. 27, 1978

Related U.S. Application Data

[63] Continuation of Ser. No. 786,422, Apr. 11, 1977, abandoned.

[51] Int. Cl.³ ............................................. B60B 7/06
[52] U.S. Cl. ............................... 301/37 P; 301/37 R; 29/159 A; 156/73.1
[58] Field of Search ................. 301/37 R, 37 P, 37 B, 301/37 PB, 37 TP, 37 CD, 37 C, 37 T, 108 R, 108 A; 24/73 HC, 73 B; 29/159 A; 156/73.1

[56] References Cited

U.S. PATENT DOCUMENTS

| | | | |
|---|---|---|---|
| 2,368,228 | 1/1945 | Lyon | 301/37 R |
| 3,006,691 | 10/1961 | Lyon | 301/37 T |
| 3,012,822 | 12/1961 | Mulhern | 301/37 R |
| 3,637,241 | 1/1972 | Dinlocker | 24/73 B X |
| 3,756,658 | 9/1973 | Adams | 301/37 P X |
| 3,773,390 | 11/1973 | Foster et al. | 301/37 R |
| 3,808,075 | 4/1974 | Worley | 156/73.1 |
| 4,007,967 | 2/1977 | Buerger | 301/37 P |
| 4,093,312 | 6/1978 | Kretschmer | 301/37 P X |

FOREIGN PATENT DOCUMENTS 1209798  10/1970  United Kingdom .................. 301/37 P Primary Examiner—Charles A. Marmor
Attorney, Agent, or Firm—Harness, Dickey & Pierce

[57] ABSTRACT

This disclosure relates to a novel retention for retaining wheel trim on the outer face of a vehicle wheel. The invention is especially adaptable for use with wheel trim made of plastic or the like. The retention comprises specially designed spring clips which consist of both a spring portion and a tab portion, the tab portion being inserted and permanently secured in slots on the underside of said wheel trim.

19 Claims, 10 Drawing Figures

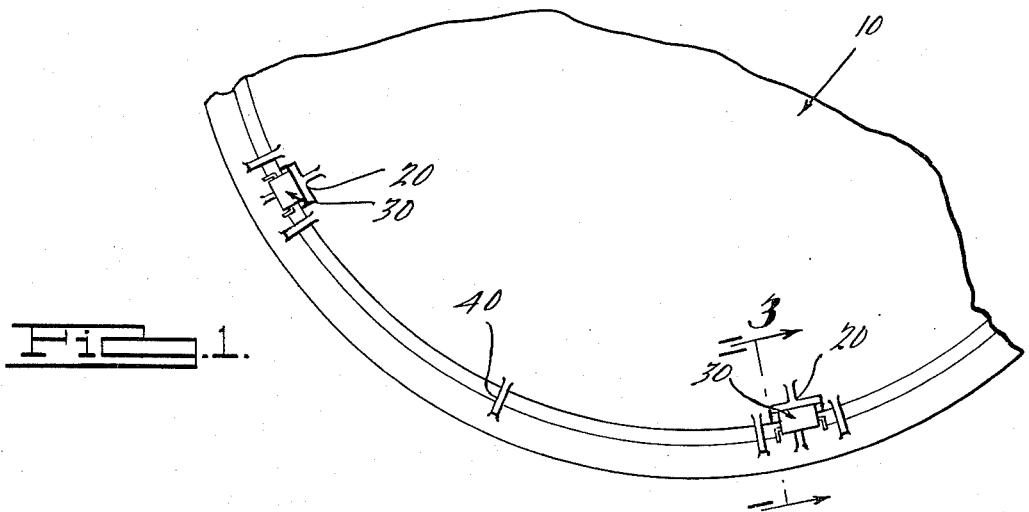
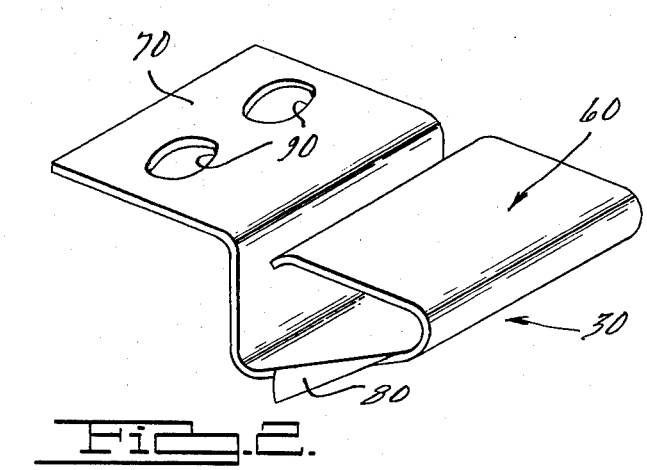
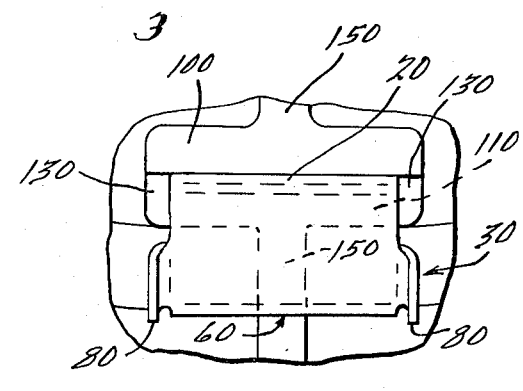
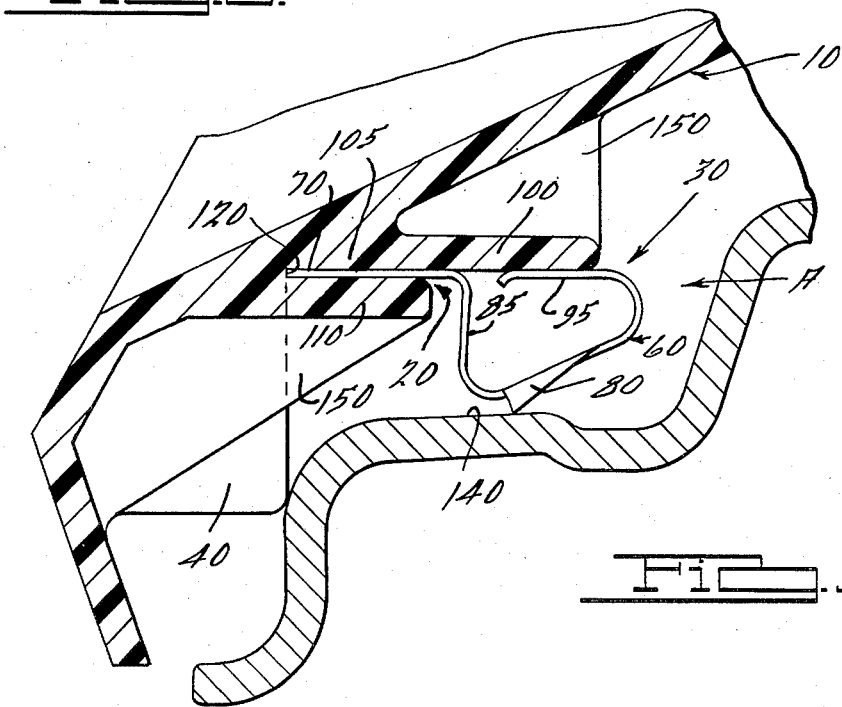

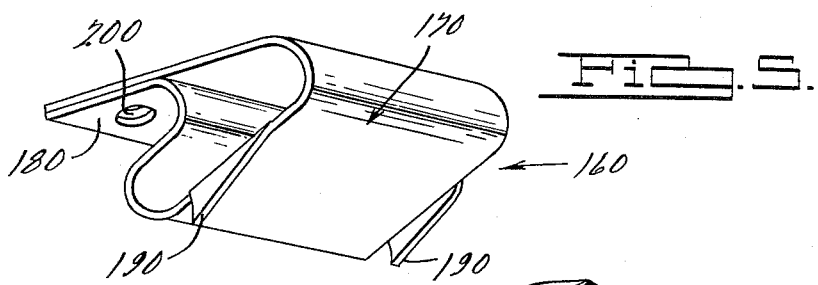
Fig. 5.
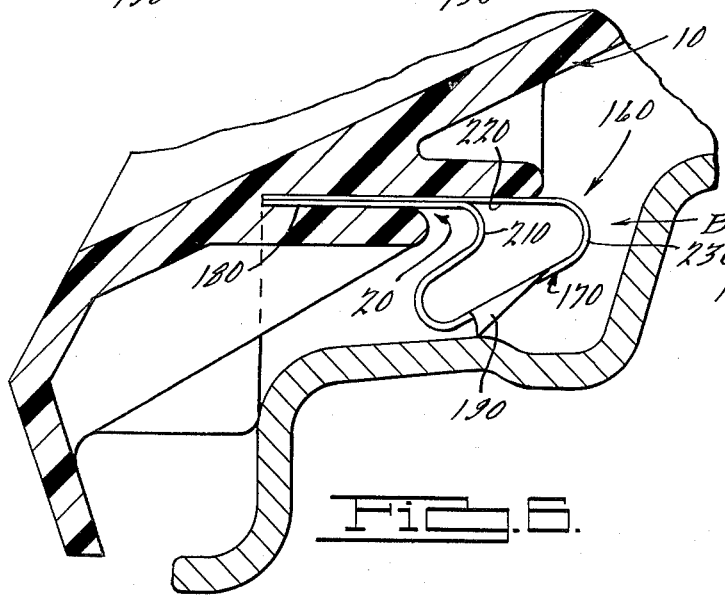
Fig. 6.
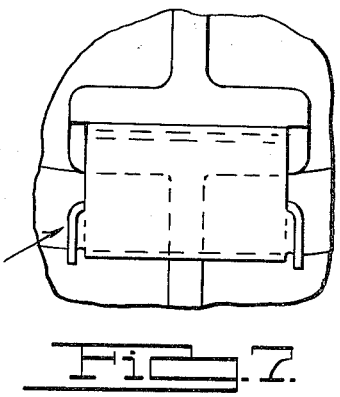
Fig. 7.
Fig. 10.
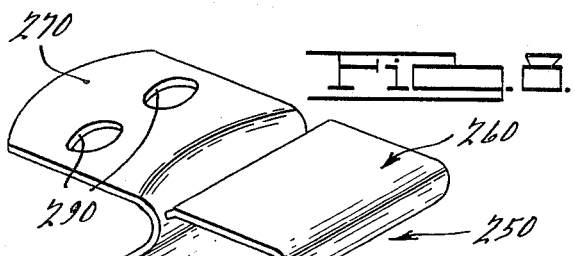
Fig. 8.
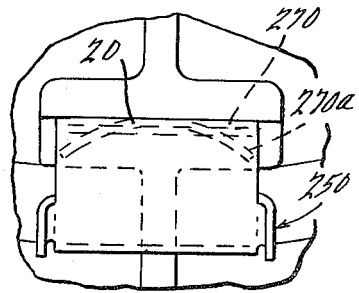
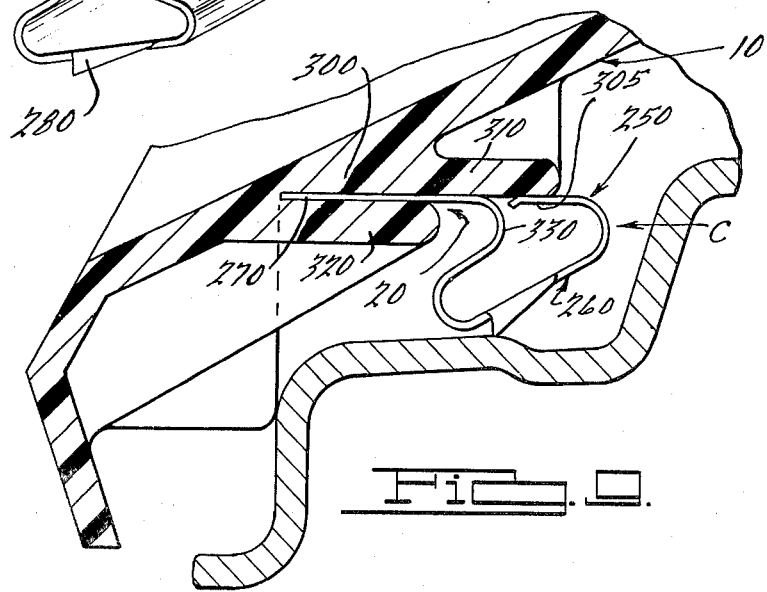
Fig. 9.

WHEEL TRIM RETENTION MEANS

This is a continuation of application Ser. No. 786,422, filed Apr. 11, 1977, now abandoned.

BACKGROUND AND SUMMARY OF THE INVENTION

The present invention pertains primarily to retention or fastening means for retaining wheel trim on vehicle wheels.

Generally speaking, the function of automotive wheel trim is to decorate and/or protect the automotive wheel, and one of the major problems in the design of a commercially successful article of wheel trim concerns meeting the desired objectives of appearance, protection, location and retention in a trim which may be economically mass produced. Retention means for retaining wheel trim on the outer face of a vehicle wheel must function to reliably retain such wheel trim in the presence of rather severe stress and strain, but must also be such as to allow easy removability of the wheel trim for access to the vehicle wheel. Such a combination of performance characteristics has proven to be very difficult to provide and still be economical to produce.

In recent years, certain wheel trim has been fabricated of plastic since most plastic is relatively inexpensive, provides substantial weight reduction, and also provides greater flexibility in design than many of the stamped wheel trim materials of the past. The problems described above, however, are compounded with plastic because of its inherent stress limitations. Consequently, many of the prior art attempts to provide an adequate solution to the problem of plastic wheel trim retention at an economically attractive cost have not been successful.

It is a principal object of the present invention, therefore, to provide a novel retention means for retaining wheel trim, and particularly plastic wheel trim, on the outer face of a vehicle wheel, which retention is reliable, is easy to remove and yet provides superior retention, and is economical to manufacture.

Other objects, features and advantages of the present invention will become apparent from the subsequent description and the appended claims taken in conjunction with the accompanying drawings.

BRIEF DESCRIPTION OF THE DRAWINGS

FIG. 1 is a partial side elevational view of the back side of a wheel cover embodying the retention means of the present invention;

FIG. 2 is a perspective view of a preferred embodiment of the spring clip of the retention means of FIG. 1;

FIG. 3 is a fragmentary sectional view taken generally along the line 3—3 in FIG. 1, showing the wheel cover and the manner in which it is affixed to a vehicle wheel, the curved periphery of the wheel cover being illustrated as being uncurved in order to show other elements of the structure;

FIG. 4 is a partial view of the structure of FIG. 3 in the direction of arrow A of FIG. 3;

FIG. 5 is a perspective view of another preferred embodiment of the spring clip of the present invention;

FIG. 6 is a view similar to FIG. 3, but showing the spring clip of FIG. 5;

FIG. 7 is a partial view of the structure of FIG. 6 in the direction of arrow B of FIG. 6;

FIG. 8 is a perspective view of yet another preferred embodiment of the spring clip of the present invention;

FIG. 9 is a view similar to FIG. 3, but showing the spring clip of FIG. 8; and

FIG. 10 is a partial view of the structure of FIG. 9 in the direction of arrow C of FIG. 9.

DESCRIPTION OF THE PREFERRED EMBODIMENT

Generally speaking, the invention comprises a plastic wheel cover 10 containing a plurality of integrally formed clip-receiving recesses 20 which are equally spaced about the inside periphery on the wheel cover, each of which contain a metal spring clip 30. A support rib 40 is located on either side of the recesses 20 as well as midway between the recesses, which functions to axially position the wheel cover 10 on a vehicle wheel and also to help maintain the dimensional stability of the wheel cover.

In the preferred embodiment of the present invention shown in FIGS. 1–4, spring clip 30 comprises a spring portion 60 and a tab portin 70. Spring portion 60 includes a retention portion having retention teeth 80, a radial connecting portion 85 interconnecting the retention portion and tab portion 70, and a terminal portion 95. Tab portion 70 is provided with a plurality of holes 90 and is disposed within clip-receiving recess 20 in such a way that terminal portion 95 of spring portion 60 contacts a support surface 100, and the retention portion of spring portion 60 which contains retention teeth 80, contacts the usual flange 140 on the vehicle wheel. Recess 20 is defined by a radially inner wall 105, a radially outer wall 110, an axially outer wall 120 and two circumferentially spaced side walls 130, radially inner wall 105 being integral with support surface 100.

When wheel cover 10 is installed on a vehicle wheel, retention teeth 80 bitingly engage the radially inner surface of wheel flange 140, which causes spring portion 60 to resiliently distort. Since connecting portion 85 of spring portion 60 is substantially straight and extends radially, it is relatively stiff in the radial direction; however, it can bend in the axial direction and terminal portion 95 can slide on wall 100 so that the clip will function to resiliently bias retention teeth 80 into biting engagenemt with the wheel and thereby retain the cover on the wheel. Recess supporting ribs 150 resist any distortion of the plastic walls defining recess 20.

Tab portion 70 may be permanently secured in recess 20 by at least partially filling holes 90 with plastic or the like, thereby creating a permanent mechanical interlock. Processes such as sonic welding, integral molding or adhesive bonding are available for creating such a mechanical interlock, with sonic welding being the preferred method for such plastic wheel trim. Sonic welding consists basically of the use of sound waves to vibrate or impact two adjacent surfaces to melt or soften material thus causing it to flow and form a welded joint. In the present application, sonic welding would be used to cause plastic from radially inner wall 105 and/or radially outer wall 110 to flow and at least partially fill holes 90 in tab portion 70. The resulting mechanical interlock would permanently retain clip 30 in recess 20. Such a mechanical interlock would also be possible by integral molding or adhesive bonding, but these methods are not believed to be as economically attractive.

Another preferred embodiment of the present invention is shown in FIGS. 5–7, using a spring clip 160 which is similar to clip 30 in that it contains a spring portion 170, a tab portion 180, retention teeth 190, and holes 200, but differs from clip 30 in two ways. First, it has a connecting portion 210 which is S-shaped rather than straight, and second, terminal portion 220 of spring portion 170 extends into recess 20 and overlaps tab portion 180 instead of being spaced apart and terminating at a point axially inwardly of the tab portion as with clip 30. Both tab portion 180 and terminal portion 220 have aligned holes 200 to provide a permanent mechanically interlocked connection between the clip and wheel cover, as in the previous embodiment. When a wheel cover containing clips 160 is installed on a vehicle wheel, S-shaped portion 210 provides more radial spring action than the straight connecting portion of clip 30 because it can bend like a hinge at point 230. On the other hand, anchoring terminal portion 220 stiffens the axially inner end of the clip, and permits the entire clip to be stronger. A clip of this type could be used where additional strength is necessary, such as with heavier wheel covers or where rigorous performance conditions are expected.

Another alternative embodiment of the present invention is shown in FIGS. 8–10, using a spring clip 250 which is again similar to clip 30 in that it contains a spring portion 260, a tab portion 270, retention teeth 280, and holes 290, but differing from this previous embodiment in that it contains a curved tab portion 270. FIG. 10 shows this tab portion in both an unstressed state 270a (in phantom) prior to insertion into recess 20 and a stressed substantially planar state 270 after insertion into recess 20. Clip 250 may be retained in recess 20 by the spring force exerted between the stressed tab portion 270 and radially inner and outer walls 300 and 320 respectively of the recess, but the permanent securing methods discussed earlier are recommended for maximum dependability. Clip 250 is similar to clip 30 in that its terminal portion 305 of its spring portion 260 is free to slide on wall 310 when subjected to installation and retention forces, but similar to clip 160 in that connecting portion 330 of its spring portion 260 is S-shaped, thus making the clip more resilient for those applications where maximum retention is desired.

It should be noted that the retention means of the present invention is equally applicable to other wheel trim such as trim rings, dust covers, etc.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. Retention means for retaining wheel trim formed of a plastic material on the axially outer face of a vehicle wheel having an annular wheel flange, said retention means comprising:
    means defining a generally axially inwardly opening recess on said wheel trim;
    means defining a generally radially outwardly facing support surface on said wheel trim positioned radially inwardly of said recess;
    a spring clip having a tab portion at one end thereof, a terminal portion at the other end thereof and a retention portion intermediate the ends thereof;
    said tab portion having a cut out portion provided therein and being disposed within said recess, said terminal portion engaging said support surface and being operative to bias said retention portion into biting engagement with said vehicle wheel when said trim member is assembled thereto; and
    securing means for permanently securing said tab portion in said recess, said securing means including a mechanical interlock created by said plastic material of said wheel trim being at least partially disposed within said cut out portion of said tab portion.

2. The retention means of claim 1 further comprising a plurality of said recesses spaced around said wheel trim, each of said recesses having a support surface associated therewith.

3. The retention means of claim 2 wherein each of said recesses is defined by radially inner and outer walls and a pair of circumferentially spaced sidewalls.

4. The retention means of claim 1 wherein said retention portion of said spring clip is connected to said tab portion by a radially connecting portion which is substantially straight.

5. The retention means of claim 4 wherein said terminal portion of said spring clip terminates at a point disposed axially inwardly of said tab portion of said spring clip.

6. The retention means of claim 5 wherein said retention member comprises at least one tooth member formed on and extending radially outwardly from said retention portion.

7. The retention means of claim 1 wherein said retention portion of said spring clip is connected to said tab portion by a radially connecting portion which is S-shaped.

8. The retention means of claim 7 wherein said terminal portion of said spring clip terminates at a point disposed axially inwardly of said tab portion of said spring clip.

9. The retention means of claim 7 wherein said terminal portion of said spring clip extends axially outwardly into said recess and overlaps said tab portion of said spring clip.

10. The retention means of claim 9 wherein said terminal portion of said spring clip also contains at least one cut out portion which is aligned with said cut out portion in said tab portion.

11. The retention means of claim 1 wherein said tab portion of said spring clip is arcuately shaped in a circumferential direction when in a relaxed state.

12. The retention means of claim 11 wherein said arcuately shaped tab portion of said spring clip is stressed by engagement with portions of said recess and is secured in part by friction created by the tendency of said stressed tab portion to resume its unstressed arcuate shape.

13. The retention means of claim 1 wherein said securing means includes a sonic weld.

14. The retention means of claim 1 wherein said spring clip is integrally molded into said recess.

15. A method of fabricating a wheel trim retention system including a retention clip for securing a wheel trim on a portion of a vehicle wheel, said method comprising:
    forming a clip receiving recess on said wheel trim;
    forming a radially outwardly facing support surface on said wheel trim;
    forming said retention clip with a tab portion at one end, a terminal portion adjacent another end and retention means intermediate said tab portion and terminal portion;

providing at least one cut out portion in said tab portion;

inserting said tab portion into said recess with said terminal portion engaging said support surface; and mechanically interlocking said tab portion and said wheel trim by causing a portion of the material of said wheel trim to enter said cut out portion.

16. The method of claim 15 wherein said tab portion and said trim are mechanically interlocked by distorting said portion of said material beyond elastic limit.

17. The method of claim 16 wherein said distorting comprises flowing of the plastic material by sonic welding.

18. The method of claim 15 further comprising inserting a part of said terminal portion into said recess along with said tab portion.

19. The method of claim 18 further comprising forming another hole in said terminal portion and inserting said terminal portion so as to bring said another hole into alignment with said hole in said tab portion.

* * * * *

UNITED STATES PATENT AND TRADEMARK OFFICE
CERTIFICATE OF CORRECTION

PATENT NO. : 4,231,619

DATED : November 4, 1980

INVENTOR(S) : Hans R. Beisch and Heinrich J. Hempelmann

It is certified that error appears in the above-identified patent and that said Letters Patent are hereby corrected as shown below:

Column 2, line 22: "portin" should be —portion—

Column 3, line 43: delete "retention" and insert in place thereof —resilience—

Claim 4, line 3: after "radially" insert —extending—

Claim 6, line 2: delete "member" (first occurrence) and insert in place thereof —portion—

Claim 7, line 3: after "radially" insert —extending—

Claim 16, line 3: after "beyond" insert —its—

Signed and Sealed this

Seventeenth Day of March 1981

[SEAL]

Attest:

RENE D. TEGTMEYER

*Attesting Officer*     *Acting Commissioner of Patents and Trademarks*